(12) United States Patent
Hinata

(10) Patent No.: US 7,480,016 B2
(45) Date of Patent: Jan. 20, 2009

(54) ELECTRO-OPTICAL DEVICE AND ELECTRONIC APPARATUS WITH REFLECTIVE POLARIZER

(75) Inventor: Shoji Hinata, Matsumoto (JP)

(73) Assignee: Epson Imaging Devices Corporation (JP)

( * ) Notice: Subject to any disclaimer, the term of this patent is extended or adjusted under 35 U.S.C. 154(b) by 89 days.

(21) Appl. No.: 11/739,849

(22) Filed: Apr. 25, 2007

(65) Prior Publication Data

US 2007/0263140 A1    Nov. 15, 2007

(30) Foreign Application Priority Data

May 11, 2006    (JP)    ............................. 2006-133005

(51) Int. Cl.
  *G02F 1/1333*    (2006.01)
  *G02F 1/1335*    (2006.01)
(52) U.S. Cl. .......................................... 349/58; 349/96
(58) Field of Classification Search ............. 349/58–60, 349/96; 361/681
  See application file for complete search history.

(56) References Cited

U.S. PATENT DOCUMENTS 6,975,455 B1 *    12/2005    Kotchick et al. ............ 359/487
7,057,681 B2 *    6/2006    Hinata et al. .................. 349/96

FOREIGN PATENT DOCUMENTS

JP    2004-085590    3/2004    .................. 349/96

* cited by examiner

Primary Examiner—David Nelms
Assistant Examiner—Dzu Luong
(74) Attorney, Agent, or Firm—Harness, Dickey & Pierce, P.L.C.

(57) ABSTRACT

An electro-optical device that includes a first module, a plate-like second module, and a hinge portion. The first module is provided with an electro-optical panel having a polarizer. The electro-optical panel is disposed on a side of a display surface of the first module, on which surface an image is displayed. The second module is provided with a reflective polarizer and has at least a translucent portion in area that overlaps with the reflective polarizer in a direction perpendicular to the reflective polarizer. The hinge portion couples the first module to the second module. The hinge portion supports the second module so that the second module, when pivoted about a first axis parallel to the display surface, is allowed to be switched between a closed position in which the display surface is covered and an opened position in which the display surface is exposed to an outside, while the hinge portion pivotally supports the second module about a second axis perpendicular to the first axis and parallel to the reflective polarizer. The polarization axis of the polarizer and the polarization axis of the reflective polarizer each are set in a direction that is not parallel and perpendicular to the first axis.

6 Claims, 13 Drawing Sheets

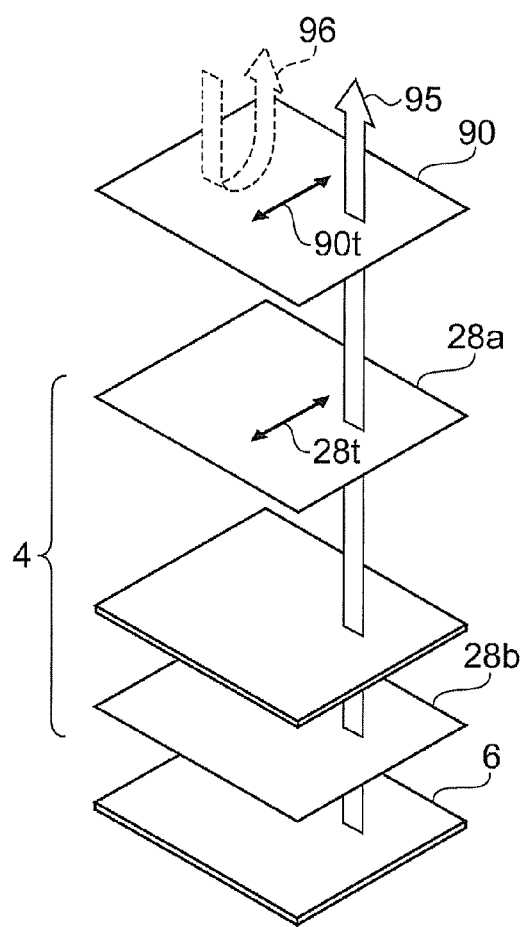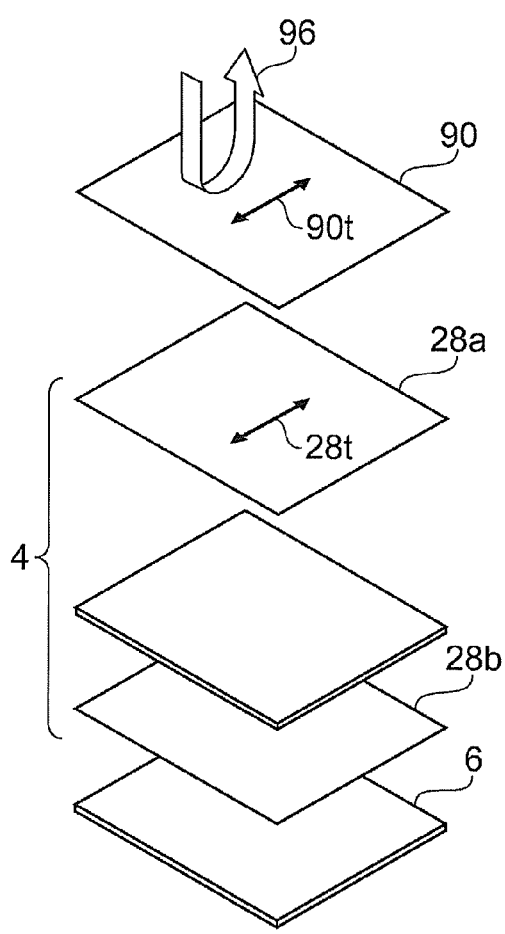

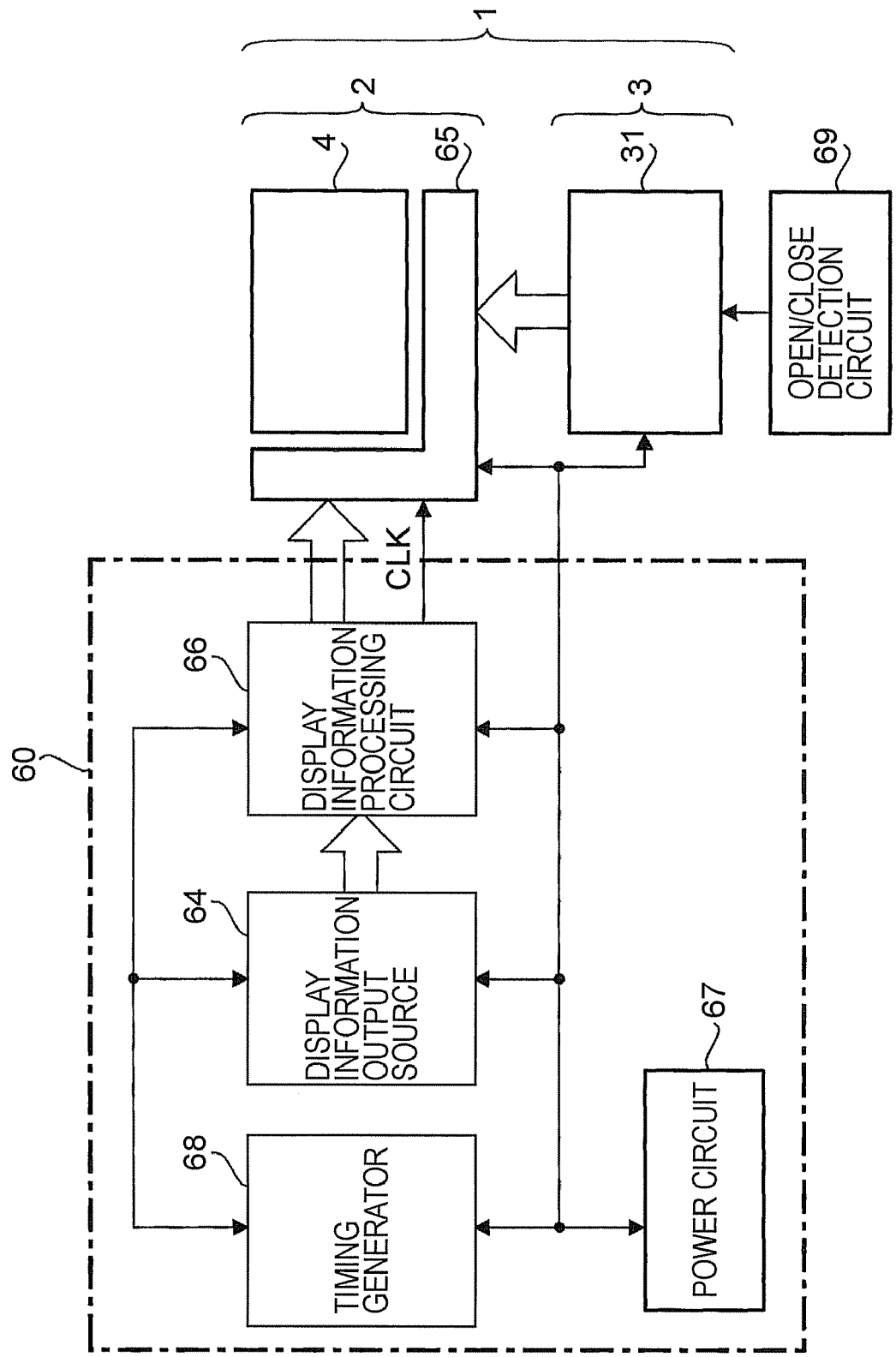

ELECTRO-OPTICAL DEVICE AND ELECTRONIC APPARATUS WITH REFLECTIVE POLARIZER

BACKGROUND

Technical Field

The present invention relates to an electro-optical device such as a liquid crystal display device. The invention also relates to an electronic apparatus that is structured using the electro-optical device.

BACKGROUND OF THE RELATED ART

Related Art

In an electro-optical device such as a liquid crystal display device having a polarizer on the side of the display surface, it is known that, by superposing a reflective polarizer on the display surface, the electro-optical device is able to function as a mirror, which is disclosed, for example, in JP-A-2004-85590. That is, the liquid crystal display device may be used so that, by disposing the polarization axis of the polarizer in parallel to the polarization axis of the reflective polarizer, it is switched between a viewing mode in which a viewer is allowed to see display light that has been transmitted through the polarizer and the reflective polarizer and a mirror mode in which a viewer is allowed to see ambient light that has been reflected by the reflective polarizer.

However, in order to implement a mirror mode in the liquid crystal display device, there is a problem that the display light must be blocked so as not to reach the reflective polarizer by turning off an auxiliary light source in the liquid crystal display device. This is because, when the display light exists in the mirror mode, the display light is transmitted through reflective polarizer to cancel the reflected light of the ambient light. On the other hand, when the polarization axis of the polarizer is disposed perpendicular to the polarization axis of the reflective polarizer, the mirror mode is always realized irrespective of the presence or absence of display light. In this case, however, the display light that has been transmitted through the polarizer cannot be transmitted through the reflective polarizer and, as a result, there will be another problem that a display cannot be performed.

SUMMARY

An advantage of some aspects of the invention is that an electro-optical device that can be switched easily between a viewing mode and a mirror mode, irrespective of the presence or absence of display light, and an electronic apparatus that employs the electro-optical device are provided.

A first aspect of the invention provides an electro-optical device that includes a first module, a plate-like second module, and a hinge portion. The first module is provided with an electro-optical panel having a polarizer. The electro-optical panel is disposed on a side of a display surface of the first module, on which surface an image is displayed. The second module is provided with a reflective polarizer and has at least a translucent portion in area that overlaps with the reflective polarizer in a direction perpendicular to the reflective polarizer. The hinge portion couples the first module to the second module. The hinge portion supports the second module so that the second module, when pivoted about a first axis parallel to the display surface, is allowed to be switched between a closed position in which the display surface is covered and an opened position in which the display surface is exposed to an outside, while the hinge portion pivotally supports the second module about a second axis perpendicular to the first axis and parallel to the reflective polarizer. The polarization axis of the polarizer and the polarization axis of the reflective polarizer each are set in a direction that is not parallel and perpendicular to the first axis.

Because the above electro-optical device has the hinge portion that serves as a so-called biaxial hinge, the following position change may be performed. That is, the second module may be changed in position from a first closed position in which a first surface of the second module is exposed to the outside to an opened position, when pivoted about the first axis. In addition, when the second module is pivoted 180 degrees from the opened position about the second axis, the second module may be placed in an opened position in which the front and back surfaces are reversed. In this state, when the second module is closed by being pivoted about the first axis, it is possible to place the second module in a second closed position in which the second surface of the second module is exposed to the outside. That is, the second module may be placed in the fist closed position and may be placed in the second closed position in which the front and back surfaces are reversed as compared to the first closed position.

The polarization axis of the reflective polarizer of the second module and the polarization axis of the polarizer of the first module each are set in a direction that is not parallel and perpendicular to the first axis, so that the relative angles (each of which selected from a pair of two relative angles is between 0 to 90 degrees) between the above two polarization axes are different when the second module is placed in the first closed position than when the second module is placed in the second closed position. Then, when the second module is placed in one of the above two closed positions whose relative angle is smaller, the viewing mode is realized. This is because, as the relative angle becomes small, display light of the electro-optical panel that has been transmitted through the polarizer tends to be transmitted through the reflective polarizer, and the viewer tends to see the display light easily. On the other hand, when the second module is placed in one of the above closed positions whose relative angle is larger, the mirror mode is realized. This is because, as the relative angle becomes large, display light that has been transmitted through the polarizer tends to be blocked (reflected) by the reflective polarizer, so that, irrespective of the presence or absence of display light, the viewer tends to see light of the ambient light reflected by the reflective polarizer. Thus, by changing a position of the second module between the first closed position and the second closed position, the viewer can easily switch between the viewing mode and the mirror mode. According to the above configuration, the electro-optical device that can be switched between the viewing mode and the mirror mode, irrespective of the presence or absence of display light, may be attained.

In the above electro-optical device, it is preferable that the polarization axis of the reflective polarizer is substantially parallel to the polarization axis of the polarizer when the second module is in the first closed position in which the first surface of the second module is exposed to the outside, and the polarization axis of the reflective polarizer is substantially perpendicular to the polarization axis of the polarizer when the second module is in the second closed position in which the second surface of the second module is exposed to the outside.

According to this configuration, the display light of the electro-optical panel may be taken out the most efficiently when the second module is placed in the first closed position (which corresponds to the viewing mode), while the display light may be blocked (reflected) the most efficiently and the visibility of reflected light of the ambient light may be improved when the second module is placed in the second closed position (which corresponds to the mirror mode). That is, according to the above configuration, high visibility may be realized both in the viewing mode and in the mirror mode.

In the above electro-optical device, it is preferable that the polarization axis of the reflective polarizer and the polarization axis of the polarizer each make an angle of 45 degrees with the first axis.

According to this configuration, by changing a position of the second module between the first closed position and the second closed position, the relative angle between the polarization axis of the reflective polarizer and the polarization axis of the polarizer may be adjusted to either 0 degree or 90 degrees. The display light of the electro-optical panel may be taken out the most efficiently when the relative angle is 0 degree (which corresponds to the viewing mode), while the display light may be blocked (reflected) the most efficiently and the visibility of reflected light of the ambient light may be improved when the relative angle is 90 degrees (which corresponds to the mirror mode). That is, according to the above configuration, high visibility may be realized both in the viewing mode and in the mirror mode.

In the above electro-optical device, it is preferable that the electro-optical device further includes a lighting device that emits light to enter the electro-optical panel, wherein the electro-optical device has the viewing mode in which light emitted from the lighting device enters the electro-optical panel and is transmitted through the second module to be seen when the second module is placed in the first closed position and the mirror mode in which light is not emitted from the lighting device and light that enters the reflective polarizer from a viewing side is reflected by the reflective polarizer to be seen.

According to this configuration, when the second module is placed in the closed position in which the relative angle between the polarization axis of the reflective polarizer and the polarization axis of the polarizer is small, that is, when it is suitable for the viewing mode, the mirror mode may be realized.

In the above electro-optical device, it is preferable that the second module includes a translucent input device that is disposed in parallel to the reflective polarizer.

According to this configuration, when the second module is placed in the closed position in which the relative angle between the polarization axis of the reflective polarizer and the polarization axis of the polarizer is small, that is, when it is suitable for the viewing mode, input operation using the input device may be performed while seeing the display of the electro-optical panel.

A second aspect of the invention provides an electronic apparatus that has the above electro-optical device.

According to the electronic apparatus having the above configuration, by changing a position of the second module of the electro-optical device between the first closed position and the second closed position, the viewing mode and the mirror mode may be switched irrespective of the presence or absence of display light.

BRIEF DESCRIPTION OF THE DRAWINGS

The invention will be described with reference to the accompanying drawings, wherein like numbers reference like elements.

FIG. 9A is a schematic view that illustrates a display function of the liquid crystal display device.

FIG. 9B is a schematic view that illustrates a display function of the liquid crystal display device.

FIG. 11 is a block diagram that shows an electronic apparatus according to one exemplary embodiment of the invention.

DESCRIPTION OF EXEMPLARY EMBODIMENTS

Figure 1:
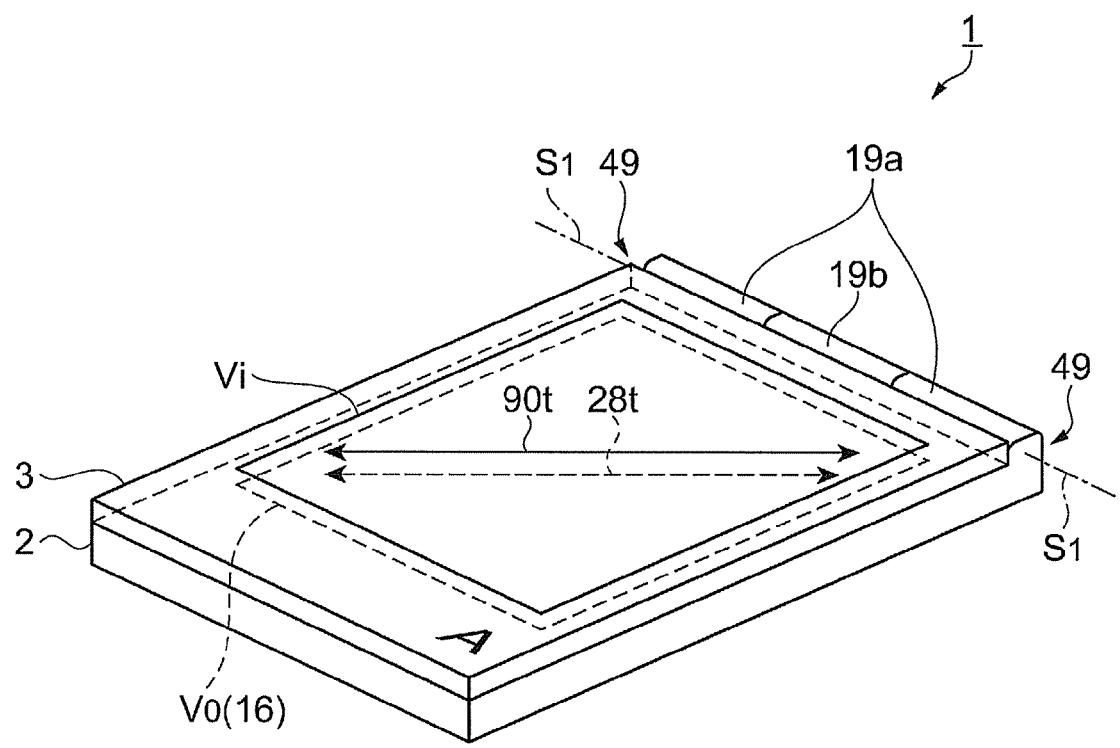
FIG. 1 is a perspective view of a liquid crystal display device (a first closed state) according to an exemplary embodiment of the invention.

An exemplary embodiment of the invention will now be described with reference to the drawings. Note that, in the accompanying drawings, to make it easier to recognize the components in the drawings, the dimensions and ratio of the components are appropriately varied from those of the actual components.

Overall Configuration of Liquid Crystal Display Device

FIGS. 1 through 5 each are a perspective view of a liquid crystal display device 1 according to the exemplary embodiment of the invention. The liquid crystal display device 1 shown in the drawings includes a liquid crystal display module 2 and a plate-like touch panel module 3. The liquid crystal display module 2 includes a liquid crystal display panel 4 (see FIG. 6). The touch panel module 3 includes a touch panel 31 (see FIG. 7). The liquid crystal display module 2 and the touch panel module 3 are coupled to each other by a hinge portion 49. The hinge portion 49 is a so-called biaxial hinge.

Configuration and Function of the Liquid Crystal Display Module 2

Figure 6:
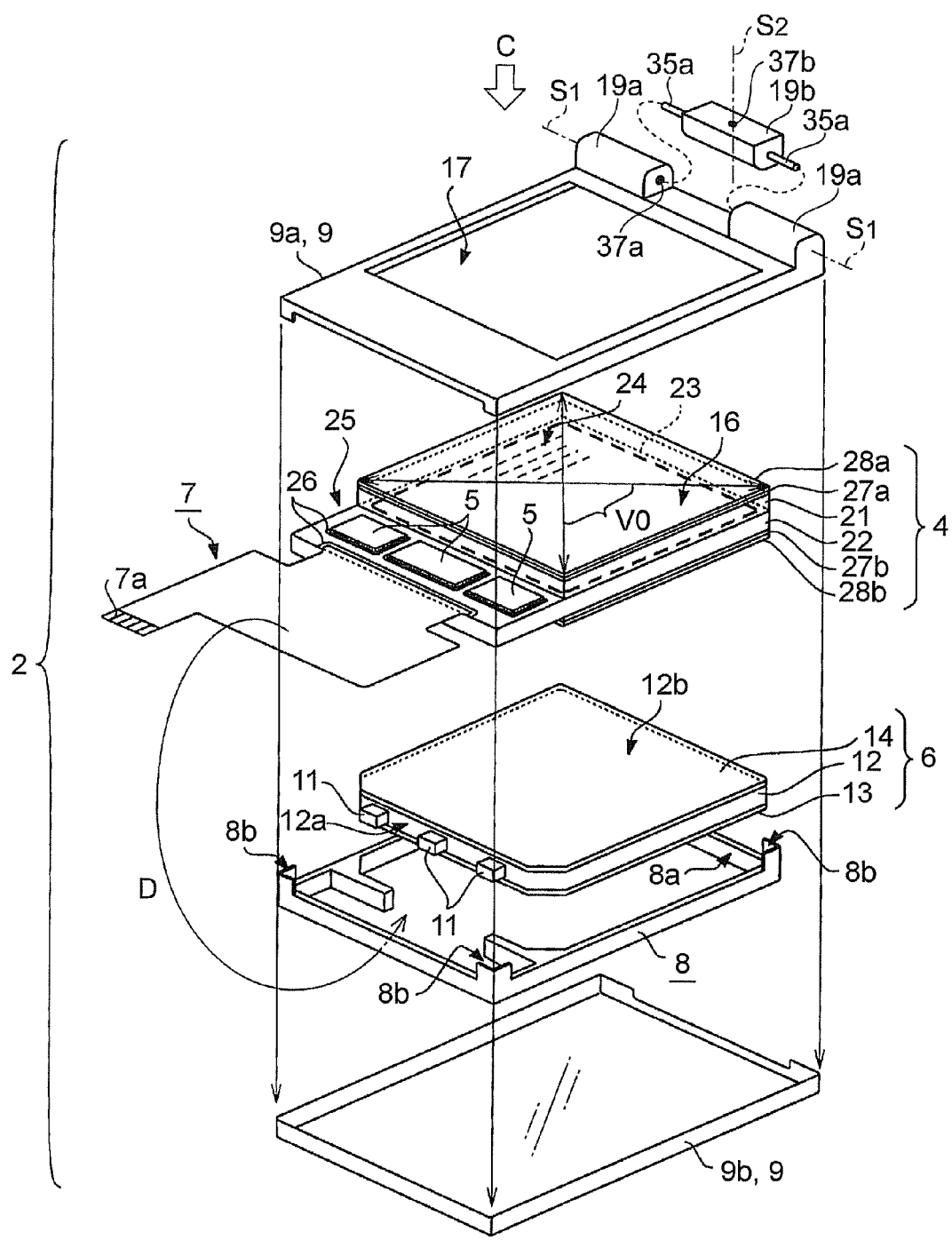
FIG. 6 is an exploded perspective view of a liquid crystal display module that is used for the liquid crystal display device shown in FIG. 1.

The liquid crystal display module 2 will be described. FIG. 6 is an exploded perspective view of the liquid crystal display module 2 according to the exemplary embodiment. The liquid crystal display module 2 includes the liquid crystal display panel 4, a lighting device 6 that is attached to the liquid crystal display panel 4, a frame 8 that supports the liquid crystal display panel 4 and the lighting device 6. Driver ICs 5 are mounted at one side of the liquid crystal display panel 4. A flexible printed circuit (FPC) substrate 7 as a wiring substrate is connected at the end of the one side of the liquid crystal display panel 4 where the driver ICs 5 are mounted.

The liquid crystal display module 2 also includes a first outer case 9a and a second outer case 9b, which are connected to form an outer case 9. Then, the liquid crystal display panel 4 and the lighting device 6 are contained in the outer case 9 while being supported by the frame 8. In the liquid crystal display module 2, a viewing side is indicated by an arrow C. First brackets 19a and a second bracket 19b, which are components of the hinge portion 49, are provided at one end of the first outer case 9a.

The lighting device 6 includes a light emitting diode (LED) 11 as a light source and a light guide body 12 that is formed of a translucent resin. Light emitted from the LED 11 passes through a light incidence plane 12a of the light guide body 12 and enters the light guide body 12, and then the light exits outside as a surface light from the light exit plane 12b. As seen from the viewing side indicated by the arrow C, a light reflective layer 13 is provided on the back surface of the light guide body 12. In addition, a light diffusing layer 14 is provided on the light exit plane 12b of the light guide body 12. The lighting device 6, as seen in the viewing direction indicated by the arrow C, is arranged on the back side of the liquid crystal display panel 4 and serves as a back light. Note that another layer having optical characteristics, other than the light diffusing layer 14, may be provided on the light exit plane 12b of the light guide body 12, where appropriate. The light source may be a point light source, other than the LED 11, or a line light source such as a cold cathode tube.

The liquid crystal display panel 4 is formed so that a first substrate 21 and a second substrate 22, each having a rectangular or square shape as seen in the viewing direction indicated by the arrow C, are adhered together by a frame seal member 23. A clearance or so-called cell gap is formed between the first substrate 21 and the second substrate 22. Liquid crystal as an electrooptic material is enclosed in the cell gap, thus forming a liquid crystal layer 24.

The first substrate 21 and the second substrate 22 each are, for example, formed of a translucent glass, a translucent plastic, or the like. A retardation film 27a and a polarizer 28a are fitted onto the outer surface of the first substrate 21 by adhesion, or the like. A retardation film 27b and a polarizer 28b are fitted onto the outer surface of the second substrate 22 by adhesion, or the like. Note that other optical elements may be applied to the surfaces of the first substrate 21 and second substrate 22, where appropriate. The polarizer 28a is an optical member that allows a polarization component parallel to a polarization axis 28t (see FIG. 1) to be transmitted therethrough and absorbs a polarization component that is perpendicular to the polarization axis 28t.

The liquid crystal display panel 4 displays images, such as text, numeric characters, and figures, on the surface adjacent to the viewing side indicated by the arrow C, namely, a display surface 16. Within the display surface 16, an area in which an image is displayed is a display area Vo. The liquid crystal display panel 4, in the case of this exemplary embodiment, may be formed of an arbitrary display mode. For example, a liquid crystal driving method may be either a passive matrix display type or an active matrix display type. The liquid crystal mode may employ a twisted nematic (TN), a super twisted nematic (STN), a homeotropic alignment mode formed of liquid crystal having a negative dielectric constant, and other arbitrary liquid crystal. The lighting type may be any one of a transmissive type, a reflective type, and a transflective type. Note that, in this exemplary embodiment, the lighting device 6 is attached to the liquid crystal display panel 4, so that the lighting type is a transmissive type or a transflective type.

The passive matrix display type is a matrix type that has no active element in each pixel. Intersections between scanning electrodes and data electrodes correspond to pixels or dots, and drive signals are directly applied thereto. The liquid crystal mode of this type includes TN liquid crystal and STN liquid crystal. The active matrix display type is a matrix type that has an active element in each pixel or dot. During data writing period the active element becomes an ON state and a data voltage is thereby written, and during the other period the active element becomes an OFF state and a voltage is thereby maintained. The active element used for this type includes a three terminal type and a two terminal type. The active element of the three terminal type is, for example, a thin film transistor (TFT). The active element of the two terminal type is, for example, a thin film diode (TFD).

When the above liquid crystal display panel 4 performs a color display, color filters are provided for the first substrate 21 or the second substrate 22. The color filters each are a filter that selectively transmits light having a specific wavelength. Specifically, color filters having three primary colors, that is, B (blue), G (green), R (red), are arranged in a one-to-one correspondence with each dot provided on the first substrate 21 or the second substrate 22 in a predetermined array, such as a stripe array, a delta array, and a mosaic array.

The second substrate 22 has an overhang portion 25 that projects outside the opposite first substrate 21. The driver ICs 5 are mounted on the surface of the overhang portion 25 adjacent to the first substrate 21, for example, by means of chip on glass (COG) technology using anisotropic conductive film (ACF) 26. The plurality of driver ICs 5, three in this exemplary embodiment, are mounted. These driver ICs 5 each output a scanning signal and a data signal to the electrodes of the liquid crystal display panel 4, thus driving the liquid crystal display panel 4.

The FPC substrate 7 is connected to one end of the overhang portion 25, for example, by means of the ACF 26. A plurality of circuit components are mounted on the FPC substrate 7 and are necessary for driving the liquid crystal display panel 4. In addition, a plurality of wirings are formed by means of patterning, and the circuit components are electrically connected to the wirings so as to form a circuit. The FPC substrate 7 is provided with an input terminal 7a, to which an output terminal of an external input device (for example, a control circuit of an electronic apparatus such as a mobile terminal device, or a touch panel) are connected. Signals output from the input device are input through the FPC substrate 7 into the driver ICs 5 of the liquid crystal display panel 4 to be displayed on the liquid crystal display panel 4.

The frame 8 includes a lighting device container 8a and engaging portions 8b for engaging the liquid crystal display panel. The frame 8 may be formed, for example, by molding using a plastic material. The lighting device container 8a is a space formed inside the frame 8, and the light guide body 12 is contained in this space. The engaging portions 8b are provided at four corners of the frame 8, respectively, each extending toward the viewing side indicated by the arrow C. The liquid crystal display panel 4, when fitted to the insides of these engaging portions 8b, is contained and supported in the frame 8.

The first outer case 9a is provided so as to cover the display surface 16 of the liquid crystal display panel 4. The first outer case 9a is provided with an opening 17, through which a display image that is realized on the display surface 16 by the liquid crystal display panel 4 may be seen. The area of the display surface 16 performing a display is a display area Vo. The second outer case 9b is provided on the back side of the frame 8 as seen in the viewing direction indicated by the arrow C. These first outer case 9a and second outer case 9b are formed of, for example, a metal such as stainless steel.

When the liquid crystal display module 2 is manufactured, the liquid crystal display panel 4 and the lighting device 6 are contained in the frame 8, and the FPC substrate 7 is bent as indicated by an arrow D so as to come into contact with or come closer to the light reflective layer 13 of the lighting device 6. In such a state where the liquid crystal display panel 4, the lighting device 6 and the frame 8 are assembled, these are covered with the first outer case 9a and the second outer case 9b so as to be held in between. Thus, the liquid crystal display module 2 is formed.

Configuration and Function of Touch Panel Module 3

Figure 7:
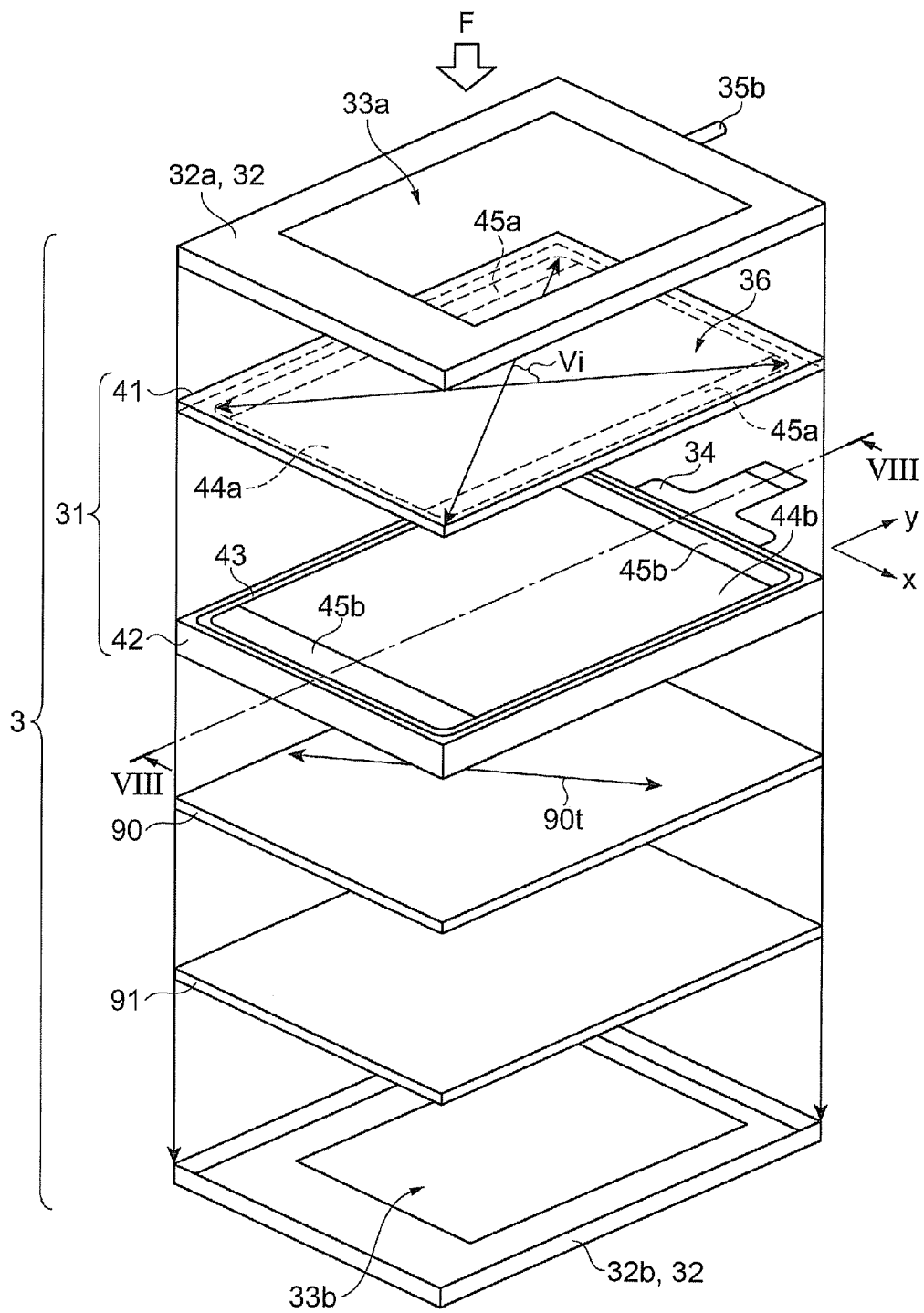
FIG. 7 is an exploded perspective view of a touch panel module that is used for the liquid crystal display device shown in FIG. 1.
Figure 8:
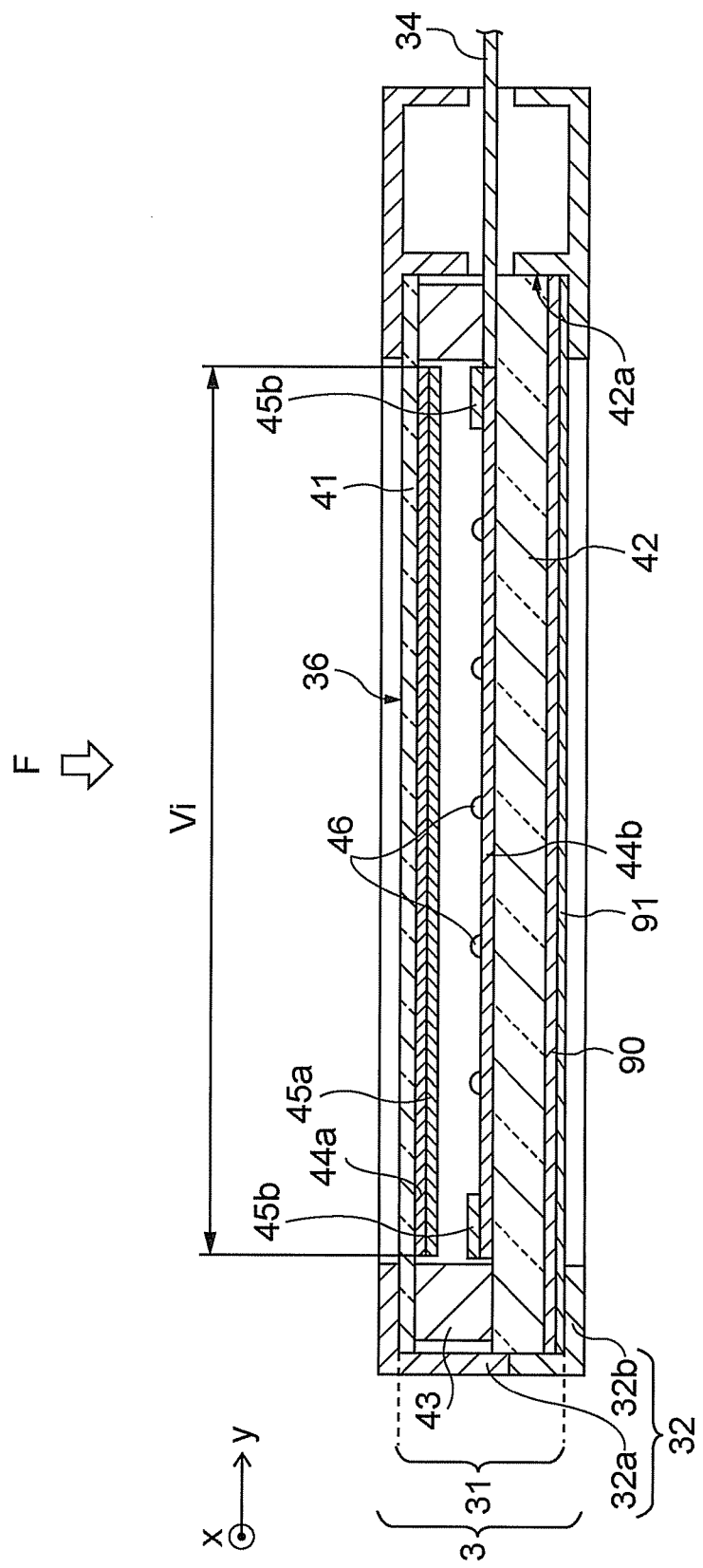
FIG. 8 is a cross-sectional view that is taken along the line VIII-VIII in FIG. 7.

The touch panel module 3 of the liquid crystal display device 1 will now be described. FIG. 7 is an exploded perspective view of the touch panel module 3. FIG. 8 is a cross-sectional view that is taken along the line VIII-VIII in FIG. 7. In FIG. 7, the touch panel module 3 includes a touch panel 31, a reflective polarizer 90, a protection member 91 of the reflective polarizer 90, a first outer case 32a, and a second outer case 32b. A wiring substrate 34 is connected to one side of the touch panel 31. The first outer case 32a and the second outer case 32b are connected with each other to form an outer case 32 as an input device case.

The touch panel 31 includes a front substrate 41 that is located on an input side indicated by an arrow F, and a back substrate 42 that is located on the back side of the front substrate 41 as seen from the input side. These substrates 41, 42 are adhered together by means of a frame adhesive 43. The front substrate 41 is formed, for example, into a film having a thickness of 0.1 to 0.2 mm using a translucent plastic, or the like. On the other hand, the back substrate 42 is formed of, for example, a translucent glass, a translucent plastic, or the like.

A plate-like surface electrode 44a is provided on a surface of the front substrate 41 opposite the back substrate 42. This surface electrode 44a is formed to have a uniform thickness in overall input area Vi that is slightly smaller than the area of the front substrate 41. A pair of low-resistance electrodes 45a are provided in substantially parallel to and adjacent to a pair of opposite sides of the surface electrode 44a.

On the other hand, a plate-like surface electrode 44b is provided on a surface of the back substrate 42 opposite the front substrate 41. This surface electrode 44b is formed to have a uniform thickness in substantially the same overall area as that of the surface electrode 44a provided on the side of the front substrate 41. A pair of low-resistance electrodes 45b are provided in substantially parallel to and adjacent to a pair of sides that are perpendicular to the sides of the surface electrode 44b at which the low-resistance electrodes 45a are provided on the corresponding sides of the front substrate 41.

The surface electrodes 44a, 44b and the low-resistance electrodes 45a, 45b are formed of, for example, a translucent conductive material such as indium tin oxide (ITO). The input area Vi at which the surface electrode 44a is provided on the front substrate 41 is an area, that is, an input area pressed by an input user, that is, a viewer, to direct a position by means of his or her own fingers or an appropriate input interface (not shown).

A plurality of dot protrusions 46 are provided on a near surface of the surface electrode 44b that is located on the far side as seen from the input side (that is, the viewing side indicated by the arrow C in FIG. 6) indicated by an arrow F in FIG. 8, opposite the surface electrode 44a. These protrusions 46 are provided on the surface electrode 44b at random. These protrusions 46 serve as spacers for maintaining the gap between the surface electrode 44a and the surface electrode 44b.

A wiring substrate 34 is connected to the end of the side of the back substrate 42 at which one of the low-resistance electrodes 45b is provided. This wiring substrate 34 is formed of, for example, a flexible substrate such as FPC substrate. For example, a touch panel control circuit (not shown) is connected through the wiring substrate 34 to the low-resistance electrode 45b. This touch panel control circuit has a voltage generating circuit and a voltage measuring circuit. In this exemplary embodiment, the touch panel control circuit is mounted in the FPC substrate shown in FIG. 6. Thus, the wiring substrate 34 shown in FIG. 8 is connected to the input terminal 7a of the FPC substrate 7 shown in FIG. 6.

The reflective polarizer 90 and the protection member 91 are stacked in this order on the back side of the back substrate 42 as seen from the input side indicated by the arrow F. The reflective polarizer 90 is an optical member that allows a polarization component of incident light that is parallel to the polarization axis 90t (see FIG. 7) to be transmitted therethrough and reflects a polarization component of the incident light that is perpendicular to the polarization axis 90t. The protection member 91 is a translucent plastic film and serves to protect the reflective polarizer 90.

In FIG. 7, the first outer case 32a is provided so as to cover an input surface 36 of the touch panel 31. The first outer case 32a is provided with an opening 33a having an area that is equal to or slightly larger than the input area Vi of the touch panel 31. An operator, that is, an input user, can press any appropriate point of the input surface 36 of the touch panel 31 through the opening 33a. In addition, a pin 35b as a shaft member, which is a component of the hinge portion 49 shown in FIG. 1, is provided at the end of the first outer case 32a. The pin 35b is provided so that the axis thereof is in parallel to a plane that is defined by the reflective polarizer 90.

The second outer case 32b is provided on the opposite side of the first outer case 32a with the touch panel 31 held in between. The second outer case 32b is also provided with an opening 33b having an area equal to or slightly larger than the input area Vi of the touch panel 31. The components located between the opening 33b and the opening 33a each are translucent, so that light that has entered the opening 33a (the opening 33b) is transmitted through the overall touch panel module 3 and then exits from the opening 33b (the opening 33a).

Note that the shape of the openings 33a, 33b is not limited to that described in this exemplary embodiment. The openings 33a, 33b only required to be formed at least part of an area that overlaps with the reflective polarizer 90 in a direction perpendicular to the reflective polarizer 90, and the shape may be varied in response to application of the liquid crystal display device 1.

The first outer case 32a and the second outer case 32b are formed of, for example, a metal, a plastic, or the like. For example, stainless steel may be used as the metal. The first outer case 32a and the second outer case 32b are connected together to form the single outer case 32 as shown in FIG. 8. The touch panel 31 is contained in the outer case 32. In this manner, the touch panel module 3 is formed.

It has been described in FIG. 7 that the touch panel control circuit (not shown) is connected to the wiring substrate 34. The touch panel control circuit separately realizes a first timing and a second timing without any overlapping point of time. At the first timing, a predetermined voltage is applied between a pair of the low-resistance electrodes 45b on the side of the back substrate 42, while a voltage between a pair of the low-resistance electrodes 45a on the side of the front substrate 41 is measured. At the second timing, a predetermined voltage is applied between the low-resistance electrodes 45a, while a voltage is measured between the low-resistance electrodes 45b on the side of the back substrate 42.

At the first timing, uniform voltage drop that a voltage varies linearly along y-direction in FIG. 7 is generated in the back surface electrode 44b, and voltage distribution is formed so that portions at the same coordinate positions in the y-direction have substantially the same potentials. At this time, when a dot portion in the front substrate 41 is pressed within the input area Vi of the touch panel module 3 that corresponds to the display area Vo of the liquid crystal display module 2 (see FIG. 1), the front surface electrode 44a and the back surface electrode 44b are in contact with each other at an area of point. Thus, a voltage of the surface electrode 44b at a position that correspond to the pressed portion may be measured by the touch panel control circuit through the front surface electrode 44a. This measured voltage value correlates with a coordinate position in the y-direction of the portion at which the front substrate 41 is pressed, so that the position in the y-direction of the pressed portion will be detected the touch panel control circuit.

In addition, when the second timing at which a voltage between the back low-resistance electrodes 45b is measured by applying a predetermined voltage between the front low-resistance electrodes 45a, uniform voltage drop is generated along the x-direction in the front surface electrode 44a and voltage distribution is formed so that a voltage linearly varies. The touch panel control circuit can detect a voltage of the surface electrode 44a that corresponds to the pressed portion of the front substrate 41 through the back surface electrode 44b. Thus, the position in the x-direction of the pressed portion may be detected.

By repeatedly switching the first timing and second timing related to the above-described touch panel control circuit at a short interval, the touch panel control circuit can detect the position coordinate in the y-direction and the position coordinate in the x-direction of the pressed portion.

Configuration and Function of Hinge Portion 49

The hinge portion 49 shown in FIG. 1 is formed of first brackets 19a provided for the first outer case 9a shown in FIG. 6, a second bracket 19b having pins 35a as shaft members, and the pin 35b as a shaft member provided for the first outer case 32a shown in FIG. 7. In FIG. 6, the second bracket 19b is provided with a hole 37b. By the pin 35b shown in FIG. 7 being fitted to the hole 37b, the touch panel module 3 and the liquid crystal display module 2 are coupled to each other.

The first brackets 19a each are provided with a hole 37a. The first brackets 19a and the second bracket 19b are coupled to each other so that the pins 35a of the second bracket 19b are fitted into the holes 37a, respectively. Specifically, the second bracket 19b is connected pivotally to the first brackets 19a about a first axis S1 that is parallel to the display surface 16 of the liquid crystal display module 2 shown in FIG. 1. Thus, the touch panel module 3 connected to the second bracket 19b is coupled pivotally about the first axis S1 relative to the liquid crystal display module 2. When the touch panel module 3 is pivoted about the first axis S1 relative to the liquid crystal display module 2, it may be placed in, for example, the first closed position shown in FIG. 1 or the opened position shown in FIG. 2.

Here, the closed position is a position in which the touch panel module 3 covers the display surface 16 of the liquid crystal display module 2, and the closed position includes the first closed position in which the touch panel module 3 covers the display surface 16 of the liquid crystal display module 2 while the first surface (which is the side the front substrate 41 is exposed in FIG. 7) of the touch panel module 3 is exposed to the outside. Hereinafter, a state of the liquid crystal display device 1 where the touch panel module 3 is placed in the closed position (the first closed position) is also called a closed state (a first closed state). The opened position is a position in which the touch panel module 3 is located so that the display surface 16 of the liquid crystal display module 2 is exposed to the outside. Hereinafter, a state of the liquid crystal display device 1 where the touch panel module 3 is placed in the opened position is also called an opened state. Note that in FIGS. 1 through 5, for recognition of the front and back surfaces of the touch panel module 3, the reference sign A is affixed to the first surface of the touch panel module 3, and the reference sign B is affixed to the second surface (which is the side the protection member 91 is exposed in FIG. 7) thereof.

The second bracket 19b and the pin 35b are connected pivotally about the second axis S2 (see FIG. 6) that is parallel to the axis of the pin 35b. Thus, the touch panel module 3 is coupled pivotally about the second axis S2 to the liquid crystal display module 2 as well. For example, as shown in FIG. 3, the touch panel module 3, when pivoted from the opened position shown in FIG. 2 about the second axis S2, may be placed in an intermediate opened position and, as shown in FIG. 4, it may also be placed in an opened position in which the front and back surfaces are reversed relative to the state shown in FIG. 2. Here, the second axis S2 is always perpendicular to the first axis S1 and always parallel to the surface of the reflective polarizer 90 in the touch panel module 3.

Figure 4:
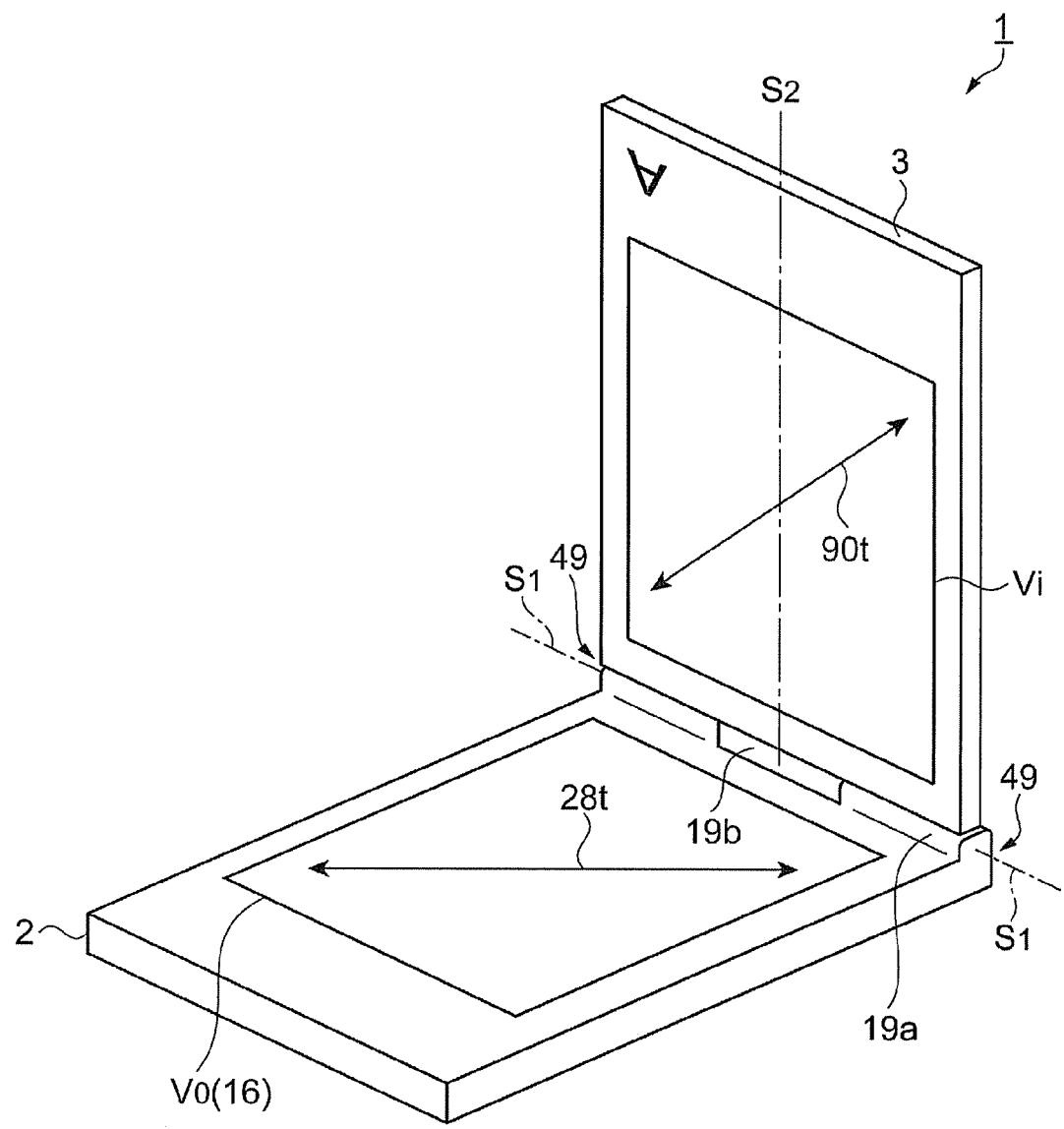
FIG. 4 is a perspective view of the liquid crystal display device (an opened state) according to the exemplary embodiment of the invention.
Figure 5:
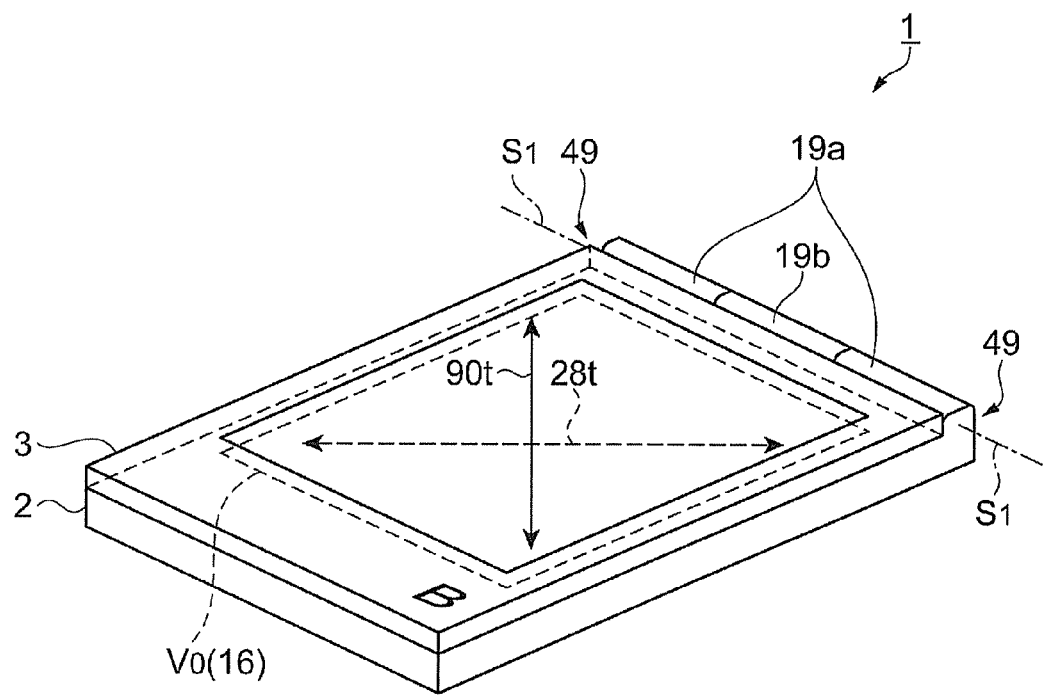
FIG. 5 is a perspective view of the liquid crystal display device in a second closed state according to the exemplary embodiment of the invention.

In addition, when the touch panel module 3 which is in the state shown in FIG. 4 is pivoted about the first axis S1 to be closed, the touch panel module 3 may be placed in the second closed position as shown in FIG. 5. Note that the second closed position is a closed position in which the second surface of the touch panel module 3 is exposed to the outside. Hereinafter, a state of the liquid crystal display device 1 where the touch panel module 3 is placed in the second closed position is also called a second closed state.

In this manner, the touch panel module 3 can freely change the position among the first closed position, the opened state, and the second closed position according to the function of the hinge portion 49 as a biaxial hinge having two rotational axes. Note that other appropriate components may be additionally provided around the brackets 19a, 19b and the pins 35a, 35b in response to a request. In addition, the hinge portion 49 is not limited to the structure described in this exemplary embodiment, but it may be various forms in response to a request.

Polarization Axes of Polarizer 28a and Reflective Polarizer

The polarization axes of the polarizer 28a and reflective polarizer 90 will now be described. In FIG. 1, the polarization axis 28t of the polarizer 28a and the polarization axis 90t of the reflective polarizer 90 are indicated by a dotted arrow and a solid arrow, respectively. In the first closed state shown in FIG. 1, the polarization axis 28t is in parallel to the polarization axis 90t, and the polarization axes 28t, 90t each are set to make an angle of 45 degrees with the first axis S1.

In FIGS. 2 through 5 as well, the polarization axes 28t, 90t are indicated by arrows, respectively. Here, in the second closed state shown in FIG. 5, the polarization axis 28t and the polarization axis 90t are perpendicular to each other. This is because the front and back surfaces of the touch panel module 3 are reversed about the second axis S2 between the first closed state and the second closed state.

Overall Behavior of Liquid Crystal Display Device

Hereinafter, the behavior of the liquid crystal display device 1 having the above configuration will be described. The liquid crystal display device 1 is used in various modes, that is, a first viewing mode, a second viewing mode, and a mirror mode. In the first viewing mode, an image displayed on the display surface 16 of the liquid crystal display module 2 is seen while performing input operation using the touch panel module 3. In the second viewing mode, an image displayed on the display surface 16 is seen only with no input operation. In the mirror mode, it is used as a mirror with no input operation or viewing. Hereinafter, each of the modes will be described separately.

First Viewing Mode

When this mode needs to be performed, the viewer places the touch panel module 3 in the first closed position as shown in FIG. 1. Then, the touch panel 31 is supplied with electricity, and the touch panel 31 turns on. In addition, the input area Vi of the touch panel module 3 and the display area Vo of the liquid crystal display module 2 are in position overlapped with each other, the polarization axis 28t of the polarizer 28a and the polarization axis 90t of the reflective polarizer 90 are in parallel to each other.

Here, a display function when the liquid crystal display device 1 is in first closed state shown in FIG. 1 will be described with reference to FIGS. 9A and 9B. FIGS. 9A and 9B each are a schematic view that specifically shows the reflective polarizer 90, the liquid crystal display panel 4 (particularly, the polarizers 28a, 28b), and the lighting device 6 among the components of the liquid crystal display device 1, in which distances between these layers are enlarged.

FIG. 9A shows a state where the lighting device 6 emits light and a display is performed by the liquid crystal display panel 4. Here, a white outline arrow 95 that is illustrated to penetrate the other components with a starting point at the lighting device 6 indicates the light emitted from the lighting device 6 and the display light of the liquid crystal display panel 4. Because the polarization axis 28t of the polarizer 28a and the polarization axis 90t of the reflective polarizer 90 are in parallel to each other, linearly polarized display light of the liquid crystal display panel 4 that has been transmitted through the polarizer 28a is transmitted through the reflective polarizer 90 to be seen by the viewer. On the other hand, a white broken outline arrow 96 that is reflected on the surface of the reflective polarizer 90 indicates ambient light. However, when a display is being performed by the liquid crystal display panel 4, the display light cancels reflected light of the ambient light, so that the reflected light of the ambient light is hardly seen. As described above, when a display is performed by the liquid crystal display panel 4 in the first closed state, the viewer sees an image that is displayed by the liquid crystal display panel 4 in the display area Vo of the liquid crystal display device 1.

When the viewer needs to perform an input operation, the viewer presses a desired point position in the input area Vi of the touch panel module 3 using his or her own finger or an appropriate input interface while seeing, through the touch panel module 3, an image that is displayed on the liquid crystal display module 2. The touch panel 31 (see FIG. 7) of the touch panel module 3 detects the pressed position as an X-Y coordinate position, and, where appropriate, outputs the detected result to a control circuit for the liquid crystal display module 2 or a host control portion that controls the liquid crystal display device 1.

In this manner, in the first viewing mode, the viewer can see an image that is displayed on the liquid crystal display module 2 and can input using the touch panel module 3.

On the other hand, FIG. 9B shows a state where, in the first viewing mode, the lighting device 6 does not emit light and a display is not performed by the liquid crystal display panel 4. At this time, the viewer does not see light emitted from the liquid crystal display panel 4 but the viewer sees light of the ambient light reflected by the reflective polarizer 90 only. Thus, when the lighting device 6 is not emitting light in the first closed state, the viewer recognizes the display area Vo of the liquid crystal display device 1 as a mirror. That is, when the lighting device 6 is made not to emit light in the first viewing mode, the mirror mode may be realized to use the liquid crystal display device 1 as a mirror with no input operation and viewing.

Note that, in order to shift the mode of the liquid crystal display device 1 to the mirror mode, other than making the lighting device 6 not to emit light, a low luminance display such as a black display may be performed in the liquid crystal display panel 4 when the lighting device 6 is made to emit light. At this time, because almost all the light emitted from the lighting device 6 is blocked by the liquid crystal display panel 4, the viewer does not see the light from the liquid crystal display panel 4 but the viewer sees the light of the ambient light reflected by the reflective polarizer 90 only. That is, the viewer recognizes the display area Vo of the liquid crystal display device 1 as a mirror. In addition, a low luminance display may be performed in part of the area of the liquid crystal display panel 4 only, and only that area may partially serve as a mirror.

Second Viewing Mode

Figure 2:
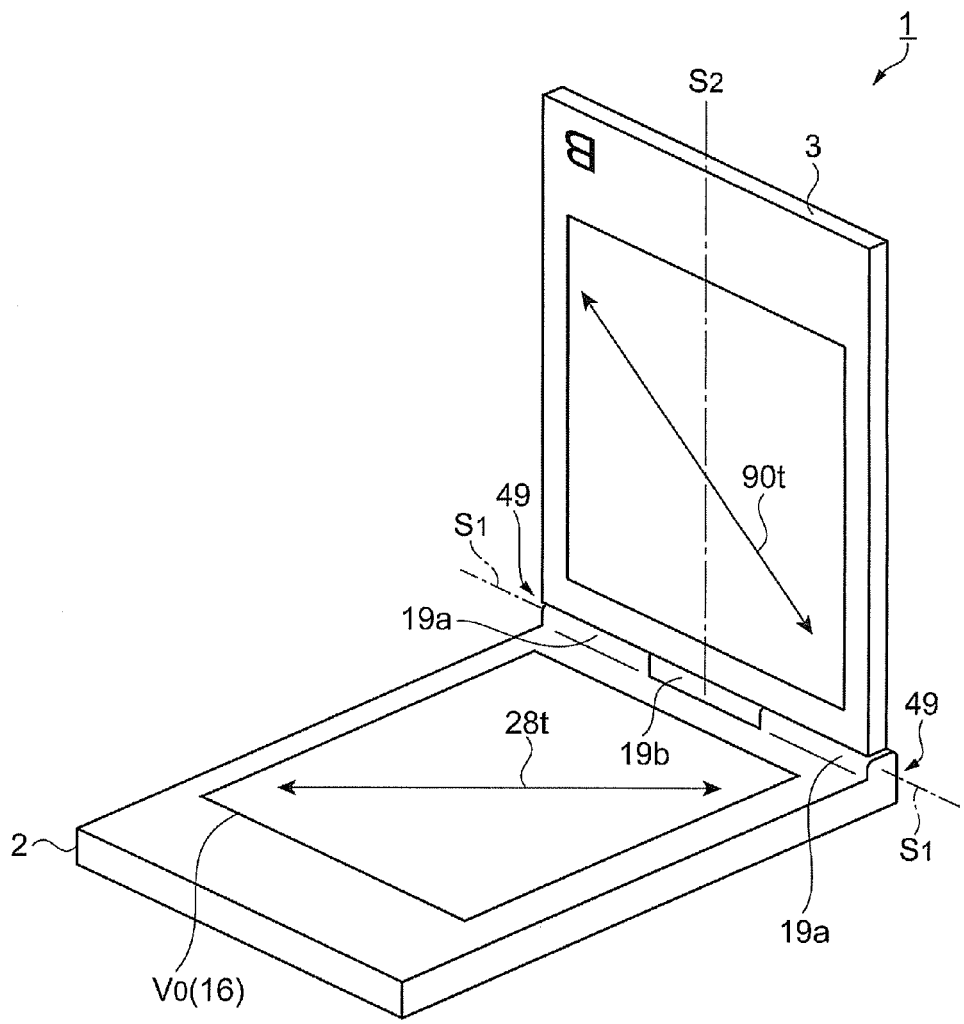
FIG. 2 is a perspective view of the liquid crystal display device (an opened state) according to the exemplary embodiment of the invention.
Figure 3:
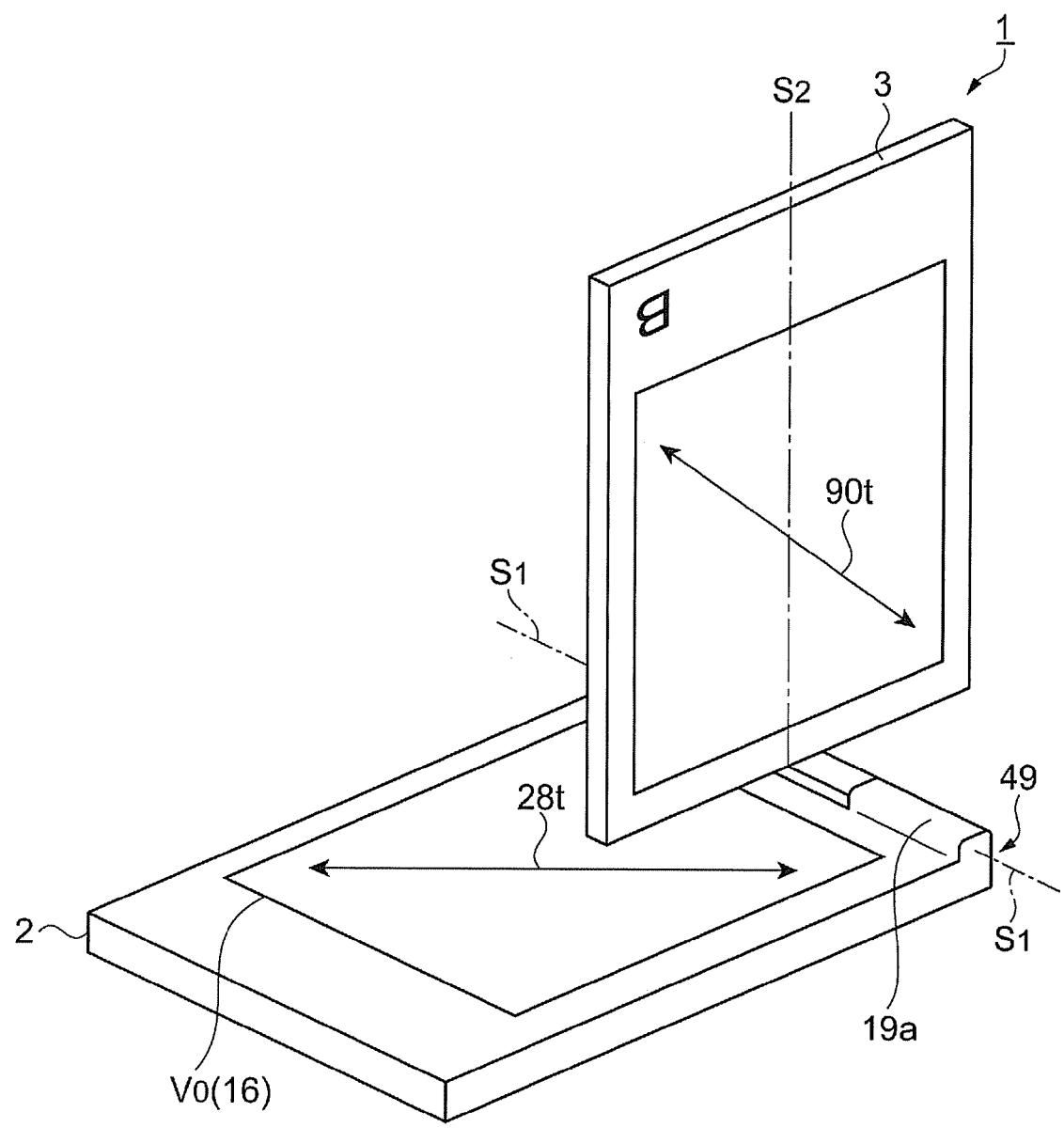
FIG. 3 is a perspective view of the liquid crystal display device (an opened state) according to the exemplary embodiment of the invention.

When this mode needs to be performed, the viewer places the touch panel module 3 in the opened position as shown in FIGS. 2 through 4. At this time, supply of electricity to the touch panel 31 (see FIG. 7) is blocked, so that the touch panel 31 is turned off. By doing so, the display surface 16 of the liquid crystal display module 2 is widely opened and exposed to the outside. In this state, the viewer sees an image that is displayed on the display surface 16. At this time, because the viewer can directly see the display surface 16 without intervening the touch panel module 3, the viewer can see the image realized by the liquid crystal display module 2 clearly.

In addition, the touch panel module 3 placed in the opened position is provided with the reflective polarizer 90, ambient light is reflected by the reflective polarizer 90. For this reason, the viewer recognizes the touch panel module 3 as a mirror. In this manner, in the second viewing mode, the touch panel module 3 may be used as a mirror while seeing an image that is displayed on the liquid crystal display module 2.

Note that, in the second viewing mode, it is not necessary to turn off the touch panel 31 as described above, but electricity consumption on the touch panel 31 may be reduced by turning off the touch panel 31. It is desirable that the hinge portion 49 has a function of fixing the touch panel module 3 when placed in the opened position. By doing so, the viewer need not hold to place the touch panel module 3 in the opened position.

Mirror Mode

When neither the liquid crystal display module 2 nor the touch panel module 3 is used, or when the liquid crystal display device needs to be used as a mirror, the viewer places the touch panel module 3 in the second closed position as shown in FIG. 5. At this time, supply of electricity to the touch panel 31 (see FIG. 7) is blocked, so that the touch panel 31 is turned off. In addition, the polarization axis 28t of the polarizer 28a and the polarization axis 90t of the reflective polarizer 90 are in position perpendicular to each other.

Figure 10:
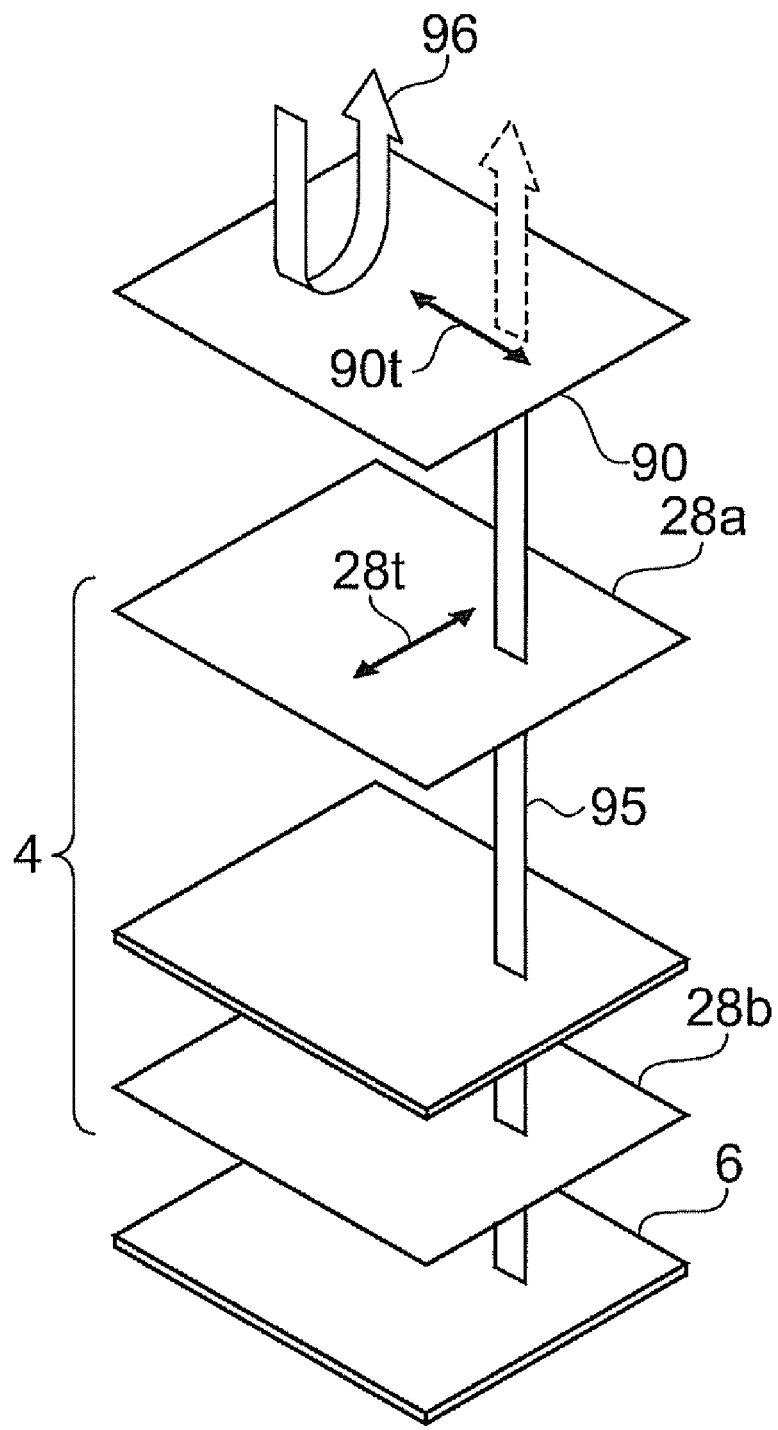
FIG. 10 is a schematic view illustrating a display function of the liquid crystal display device.

Here, a display function when the liquid crystal display device 1 is placed in the second closed state shown in FIG. 5 will be described with reference to FIG. 10. FIG. 10 is a schematic view that specifically shows the reflective polarizer 90, the liquid crystal display panel 4 (particularly, the polarizers 28a, 28b), and the lighting device 6 among the components of the liquid crystal display device 1, in which distances between these layers are enlarged.

As shown in FIG. 10, even when light is emitted from the lighting device 6 (indicated by the arrow 95) and the light is transmitted through the liquid crystal display panel 4, the light is blocked (reflected) by the reflective polarizer 90, so that the light is not seen by the viewer. Needless to say, when the lighting device 6 is not emitting light, the viewer does not see light from the liquid crystal display panel 4. On the other hand, ambient light (indicated by the arrow 96) that enters the reflective polarizer 90 will be reflected by the reflective polarizer 90 to be seen by the viewer. Thus, the viewer recognizes the display area Vo of the liquid crystal display device 1 as a mirror. In this manner, in the mirror mode in which the touch panel module 3 is placed in the second closed position, the viewer can use the liquid crystal display device 1 as a mirror, irrespective of the lighting device 6 emitting or not emitting light, that is, irrespective of the presence or absence of display light of the liquid crystal display panel 4.

The touch panel module 3 also serves as a protection cover for the display surface 16 of the liquid crystal display module 2.

As described above, by changing a position of the touch panel module 3, the viewer can use the liquid crystal display device 1 in an arbitrary mode among the above-described modes. Particularly, even when the lighting device 6 always emits light to generate display light, by changing a position of the touch panel module 3 between the first closed position and the second closed position, the viewing mode and the mirror mode may be easily switched. When switching the modes, it is not required to switch the lighting device 6 emitting or not emitting light inside the liquid crystal display device 1, so that a circuit configuration of the liquid crystal display device 1 may be simplified.

Electronic Apparatus

An exemplary embodiment of an electronic apparatus according to the invention will now be described. Note that this exemplary embodiment is only illustrative, and the invention is not limited to this exemplary embodiment.

FIG. 11 is a block diagram of an electronic apparatus according to one exemplary embodiment of the invention. FIG. 12 shows a mobile terminal device 70, which is one example of the electronic apparatus shown in the block diagram of FIG. 11. The electronic apparatus shown in FIG. 11 includes a liquid crystal display device 1 and a control circuit 60 that controls the liquid crystal display device 1. The control circuit 60 includes a display information output source 64, a display information processing circuit 66, a power circuit 67, and a timing generator 68. The liquid crystal display device 1 includes a liquid crystal display module 2 that is provided with a liquid crystal display panel 4 and a driver circuit 65, and a touch panel module 3 that is provided with a touch panel 31.

The display information output source 64 is provided with a memory such as a read only memory (ROM) and a random access memory (RAM), a storage unit such as various types of disks, a tuned circuit that turns and outputs a digital image signal, or the like, and supplies the display information processing circuit 66 with display information such as an image signal of a predetermined format according to various clock signals that are generated by the timing generator 68.

The display information processing circuit 66 is provided with various known circuits such as an amplifying/inverting circuit, a rotation circuit, a gamma correction circuit, and a clamp circuit, and executes processing input image information and then supplies an image signal to the driver circuit 65 together with the clock signal CLK. Here, the driver circuit 65 represents a check circuit, and the like, together with a scanning line driving circuit and a data line driving circuit. In addition, the power circuit 67 supplies a predetermined power voltage to each of the components.

Figure 12A:
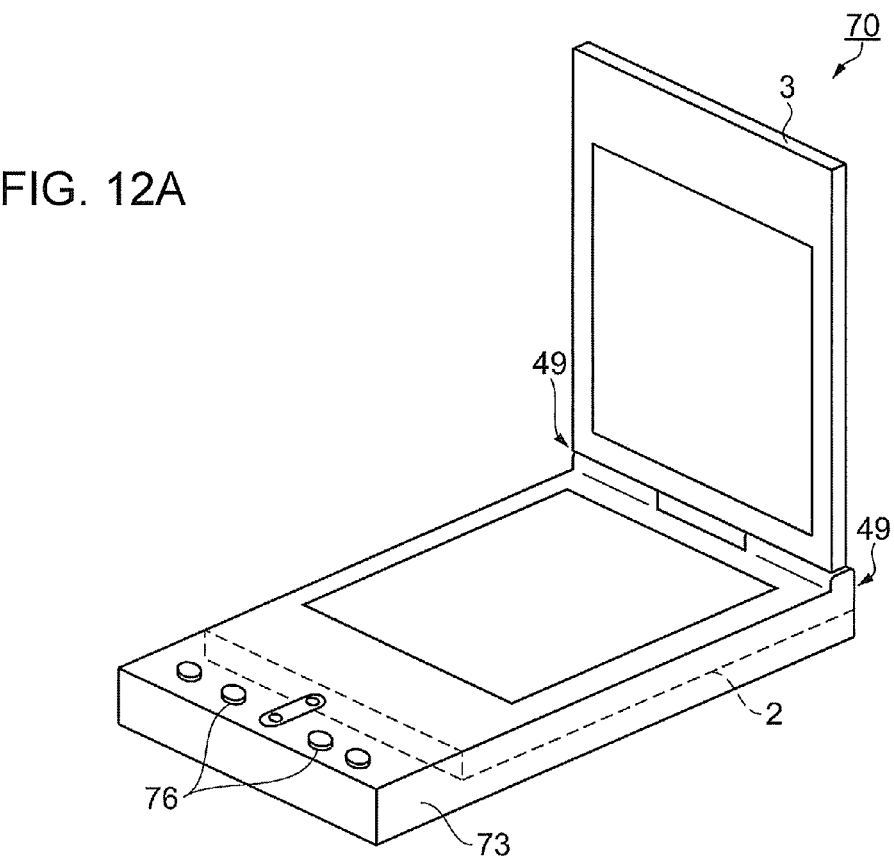
FIG. 12A is a perspective view of a mobile terminal device which is in an opened state according to one example of the electronic apparatus shown in FIG. 11.
Figure 12B:
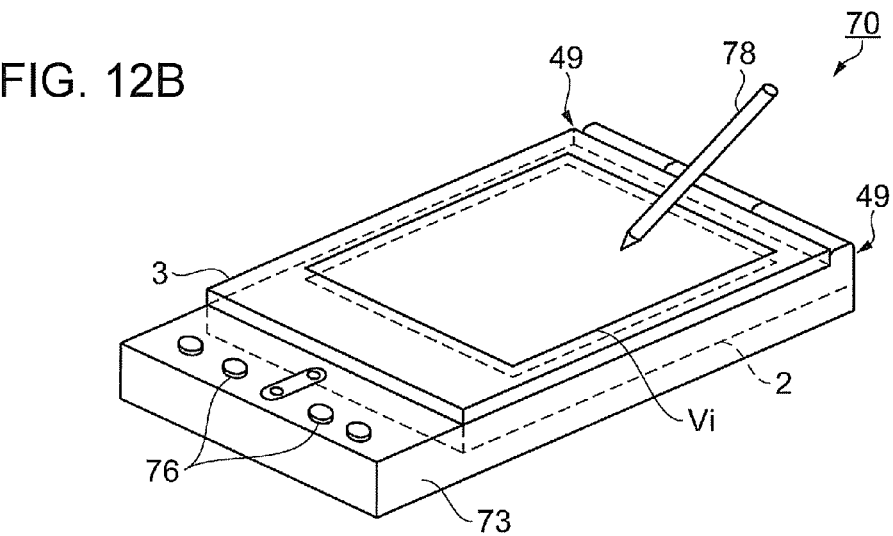
FIG. 12B is a perspective view of a mobile terminal device which is in a closed state according to one example of the electronic apparatus shown in FIG. 1.

The electronic apparatus shown in the block diagram in FIG. 11 is, for example, structured as the mobile terminal device 70 shown in FIGS. 12A and 12B. This mobile terminal device 70 is provided with the above-described liquid crystal display device 1 that includes the liquid crystal display module 2 and the touch panel module 3. That is, the mobile terminal device 70 includes the touch panel module 3 and a body section 73 whose case contains the liquid crystal display module 2, and the touch panel module 3 and the body section 73 are supported by the hinge portion 49 so as to be openable and closable. FIG. 12A shows the opened state where the touch panel module 3 is placed in the opened position. FIG. 12B shows the closed state where the touch panel module 3 is placed in the closed position (the first closed position or the second closed position).

Here, whether or not an input operation using the touch panel module 3 is performed may be switched by opening or closing the touch panel module 3. For this reason, as shown in FIG. 11, the electronic apparatus includes an open/close detection circuit 69 that detects an open/close state of the touch panel module 3.

In the mobile terminal device 70 shown in FIGS. 12A and 12B, when the input operation using the touch panel module 3 is performed, the touch panel module 3 is changed in position from the opened position shown in FIG. 12A to the closed position (the first closed position) shown in FIG. 12B. By doing so, the open/close detection circuit 69 shown in FIG. 11 detects the closed state of the touch panel module 3, and thereby the touch panel 31 is activated. Then, the input operation using, for example, an input pen 78 shown in FIG. 12B is enabled in the input area Vi.

On the other hand, when an input operation using the touch panel module 3 is not performed, the touch panel module 3 is changed in position from the closed position shown in FIG. 12B to the opened position shown in FIG. 12A. By doing so, the open/close detection circuit 69 shown in FIG. 11 detects the opened state of the touch panel module 3, and the operation of the touch panel 31 (see FIG. 7) is stopped. Note that the input operation in the mobile terminal device 70 using input buttons 76 provided in the body section 73, other than the touch panel 31, may also be performed.

The mobile terminal device 70 as well as the liquid crystal display device 1 may be switched to use various modes by changing a position of the touch panel module 3. That is, the first viewing mode may be performed by placing the touch panel module 3 in the first closed position, the second viewing mode may be performed by placing the touch panel module 3 in the opened position, and the mirror mode may be performed by placing the touch panel module 3 in the second closed position.

In addition, the liquid crystal display device 1 is configured so that maintenance work of the touch panel 31 may be easily performed by placing the touch panel module 3 in the opened state. Thus, in the mobile terminal device 70 shown in FIGS. 12A and 12B, which employs the liquid crystal display device 1 as well, maintenance work may be easily performed by placing the touch panel module 3 in the opened state shown in FIG. 12A.

Embodiments of the electronic apparatus according to the invention may be, other than the above described mobile terminal device 70, a cellular phone, a personal computer, a liquid crystal display television, a viewfinder type or a direct view type video tape recorder, a car navigation system, a pager, a personal organizer, an electronic calculator, a word processor, a workstation, a video telephone, a point-of-sales terminal, or the like.

Though the exemplary embodiments according to the invention are described above, the above exemplary embodiments may be modified into various forms without departing from the scope of the invention. For example, the following alternative exemplary embodiments are applicable.

Alternative Exemplary Embodiment 1

In the above exemplary embodiments, the touch panel module 3 that includes the reflective polarizer 90 and the touch panel 31 is employed. However, in order for the liquid crystal display device 1 to have the function of easily switching between the viewing mode and the mirror mode irrespective of the presence or absence of display light, the touch panel module 3 may be replaced by a module that has at least the reflective polarizer 90.

Figure 13:
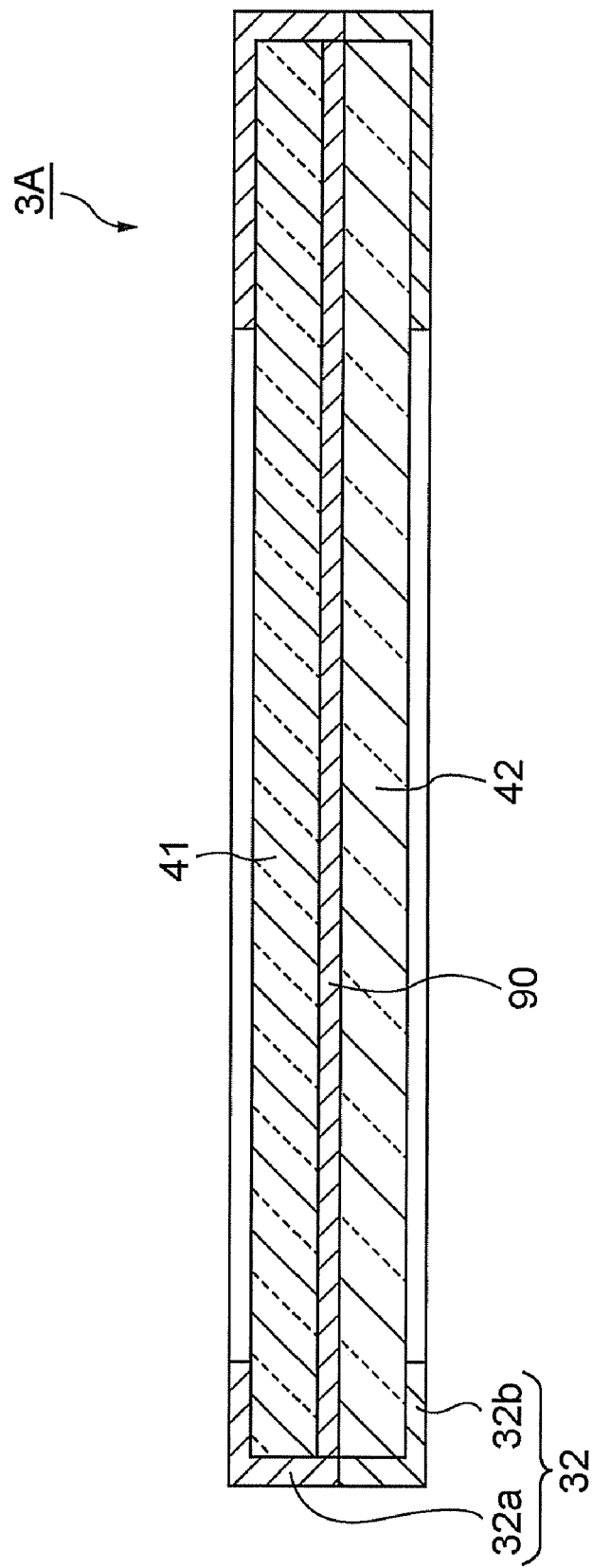
FIG. 13 is a cross-sectional view of a second module according to an alternative exemplary embodiment of the invention.

FIG. 13 shows a cross-sectional view of a module 3A in place of the touch panel module 3. As shown in the drawing, the module 3A includes the reflective polarizer 90 that is interposed between the front substrate 41 and the back substrate 42, and these reflective polarizer 90, first substrate 41 and back substrate 42 are contained in the outer case 32 that is formed of the first outer case 32a and the second outer case 32b. The front substrate 41 and the back substrate 42 each may be formed of a translucent glass substrate, a translucent plastic substrate, or the like. The polarization axis 90t of the reflective polarizer 90, as in the case of the first exemplary embodiment, is set to make an angle of 45 degrees (see FIG. 1) with the first axis S1.

The liquid crystal display device 1 employing thus configured module 3A operates the same as in the case of the first exemplary embodiment except not providing an input function. That is, in the first viewing mode in which the module 3A is placed in the first closed position, an image displayed on the liquid crystal display panel 4 may be seen through the module 3A, while it may be switched to the mirror mode when the lighting device 6 in this state is made into a state in which light is not emitted. Furthermore, in the second viewing mode in which the module 3A is placed in the opened position, an image displayed on the liquid crystal display panel 4 may be directly seen, while the module 3A itself serves as a mirror. Moreover, in the mirror mode in which the module 3A is placed in the second closed position, the liquid crystal display device 1 may be used as a mirror, irrespective of the presence or absence of display light of the liquid crystal display panel 4.

Thus, in this alternative exemplary embodiment as well, by changing a position of the module 3A between the first closed position and the second closed position, the viewing mode and the mirror mode may be easily switched even when the lighting device 6 is emitting the display light.

The touch panel module 3 may be replaced by other modules having various forms other than the above described one. Specifically, various translucent members may be superposed on the reflective polarizer 90. For example, the module may include, together with the reflective polarizer 90, other than the above described touch panel 31, a cover glass, a front light, a liquid crystal display panel, a retardation film, a polarizer, an ultraviolet absorption film, a viewing angle compensation film, or the like. The order in which these components and the reflective polarizer 90 are stacked may be determined freely in response to a request.

Alternative Exemplary Embodiment 2

In the above exemplary embodiments, the polarization axis 28t of the polarizer 28a and the polarization axis 90t of the reflective polarizer 90 each are set to make an angle of 45 degrees with the first axis S1. However, the invention is not intended to be limited to this. It is applicable that the polarization axes 28t, 90t each are set in a direction that is not parallel and perpendicular to the first axis S1. According to this configuration, the relative angle (which selected from a pair of two relative angles is between 0 to 90 degrees) between the polarization axes 28t, 90t will be definitely different when the touch panel module 3 is placed in the first closed position than when the touch panel module 3 is placed in the second closed position.

Here, the following behavior will occur when the touch panel module 3 is changed in position between the first closed position and the second closed position in a state when the lighting device 6 is emitting light and an image is displayed on the liquid crystal display module 2. That is, a display image when the touch panel module 3 is placed in the closed position in which the above relative angle becomes large is darker than a display image when the touch panel module 3 is placed in the closed position in which the above relative angle becomes small. This is because much more component of display light that has been transmitted through the polarizer 28a is blocked (reflected) by the reflective polarizer 90. At this time, the darker the image due to display light, the further the visibility of the reflected light of ambient light is improved. Thus, the viewer recognizes this state as a mirror mode. In contrast, an image displayed when the above relative angle becomes small is relatively bright, so that the viewer recognizes this state as a viewing mode. Thus, the viewer can easily switch between the viewing mode and the mirror mode by changing a position of the touch panel module 3 between the first closed position and the second closed position, irrespective of the presence or absence of display light.

Here, it is preferable that the difference is larger between the relative angle in the first closed position and the relative angle in the second closed position, and more preferably, the difference between the relative angles is 90 degrees. As the difference between the relative angles comes closer to 90 degrees, it becomes clear in functional difference between the viewing mode and the mirror mode, thus performing a well-differentiated image displaying. That is, the relative angle becomes approximately 0 degree in the viewing mode, so that an image displayed on the liquid crystal display panel 4 may be clearly viewed. The relative angle becomes approximately 90 degrees in the mirror mode, so that the display light is blocked and the visibility of reflected light of ambient light is improved.

Alternative Embodiment 3

The invention is applicable to various electro-optical devices, each of which are provided with an electro-optical panel having a polarizer that is disposed on the side of the display surface of the electro-optical device, other than the liquid crystal display device 1 described above. For example, the invention is applicable to an organic electroluminescence device, or the like, provided with an organic electroluminescence panel for which a polarizer is disposed on the side of the display surface so as to reduce reflection of ambient light, or the like.

The entire disclosure of Japanese Patent Application No. 2006-133005, filed May 11, 2006 is expressly incorporated by reference herein.

What is claimed is:

1. An electro-optical device comprising:
a first module provided with an electro-optical panel having a polarizer on a side of a display surface of the first module, on which surface an image is displayed;
a plate-like second module provided with a reflective polarizer and having at least a translucent portion in area that overlaps with the reflective polarizer in a direction perpendicular to the reflective polarizer; and
a hinge portion that couples the first module to the second module, wherein the hinge portion supports the second module so that the second module, when pivoted about a first axis parallel to the display surface, is allowed to be switched between a closed position in which the display surface is covered and an opened position in which the display surface is exposed to an outside, while the hinge portion pivotally supports the second module about a second axis perpendicular to the first axis and parallel to the reflective polarizer, and wherein
a polarization axis of the polarizer and a polarization axis of the reflective polarizer each are set in a direction that is not parallel and perpendicular to the first axis.

2. The electro-optical device according to claim 1, wherein the polarization axis of the reflective polarizer is substantially in parallel to the polarization axis of the polarizer when the second module is placed in a first closed position in which a first surface of the second module is exposed to the outside, and wherein the polarization axis of the reflective polarizer is substantially perpendicular to the polarization axis of the polarizer when the second module is placed in a second closed position in which a second surface of the second module is exposed to the outside.

3. The electro-optical device according to claim 2, wherein the polarization axis of the reflective polarizer and the polarization axis of the polarizer each make an angle of 45 degrees with the first axis.

4. The electro-optical device according to claim 2, further comprising:
a lighting device that allows light to enter the electro-optical panel, wherein
the electro-optical device, in a state where the second module is placed in the first closed position, has a viewing mode in which the light emitted from the lighting device enters the electro-optical panel and is transmitted through the second module to be viewed, and a mirror mode in which light is not emitted from the lighting device and light that enters the reflective polarizer from a viewing side is reflected on the reflective polarizer to be viewed.

5. The electro-optical device according to claim 1, wherein the second module includes a translucent input device that is disposed in parallel to the reflective polarizer.

6. An electronic apparatus having the electro-optical device according to claim 1.

* * * * *